(12) United States Patent
Kirazci et al.

(10) Patent No.: US 11,735,182 B2
(45) Date of Patent: Aug. 22, 2023

(54) MULTI-MODAL INTERACTION BETWEEN USERS, AUTOMATED ASSISTANTS, AND OTHER COMPUTING SERVICES

(71) Applicant: Google LLC, Mountain View, CA (US)

(72) Inventors: Ulas Kirazci, Mountain View, CA (US); Adam Coimbra, Cupertino, CA (US); Abraham Lee, Belmont, CA (US); Wei Dong, Union City, CA (US); Thushan Amarasiriwardena, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 140 days.

(21) Appl. No.: 17/192,230

(22) Filed: Mar. 4, 2021

(65) Prior Publication Data

US 2021/0193146 A1 Jun. 24, 2021

Related U.S. Application Data

(63) Continuation of application No. 15/774,950, filed as application No. PCT/US2018/031444 on May 7, 2018, now Pat. No. 10,984,786.

(51) Int. Cl.
*G10L 15/00* (2013.01)
*G10L 15/22* (2006.01)
(Continued)

(52) U.S. Cl.
CPC .............. *G10L 15/22* (2013.01); *G06F 3/167* (2013.01); *G06F 9/4498* (2018.02);
(Continued)

(58) Field of Classification Search
CPC .......... G10L 15/22; G10L 15/30; G06F 16/34
See application file for complete search history.

(56) References Cited

U.S. PATENT DOCUMENTS 7,885,388 B2  2/2011  Wong et al.
8,458,655 B1  6/2013  Linebarger et al.
(Continued)

FOREIGN PATENT DOCUMENTS

JP  2013517566     5/2013
JP  2013137584 A   7/2013
(Continued)

OTHER PUBLICATIONS

European Patent Office; the minutes of Oral Proceedings in accordance with Rule 124(4) issued in Application No. 18729841.9, 7 pages, dated Apr. 13, 2022.
(Continued)

*Primary Examiner* — Daniel Abebe
(74) *Attorney, Agent, or Firm* — Gray Ice Higdon

(57) ABSTRACT

Techniques are described herein for multi-modal interaction between users, automated assistants, and other computing services. In various implementations, a user may engage with the automated assistant in order to further engage with a third party computing service. In some implementations, the user may advance through dialog state machines associated with third party computing service using both verbal input modalities and input modalities other than verbal modalities, such as visual/tactile modalities.

12 Claims, 10 Drawing Sheets

(51) Int. Cl.
   *G06F 9/448* (2018.01)
   *G06F 3/16* (2006.01)
   *G10L 13/027* (2013.01)
(52) U.S. Cl.
   CPC ...... *G10L 13/027* (2013.01); *G10L 2015/223* (2013.01); *G10L 2015/228* (2013.01)

(56) References Cited

U.S. PATENT DOCUMENTS

| | | | |
|---|---|---|---|
| 9,436,820 | B1 | 9/2016 | Gleichauf et al. |
| 10,482,874 | B2 | 11/2019 | Thomson et al. |
| 10,515,625 | B1* | 12/2019 | Metallinou ........... G10L 15/197 |
| 10,984,786 | B2 | 4/2021 | Kirazci et al. |
| 11,200,893 | B2 | 12/2021 | Kirazci et al. |
| 2003/0144055 | A1 | 7/2003 | Guo et al. |
| 2004/0172258 | A1 | 9/2004 | Dominach et al. |
| 2006/0206336 | A1 | 9/2006 | Gurram et al. |
| 2010/0094635 | A1 | 4/2010 | Bermudez |
| 2011/0022393 | A1 | 1/2011 | Waller et al. |
| 2012/0293551 | A1 | 11/2012 | Momeyer et al. |
| 2013/0275164 | A1* | 10/2013 | Gruber .................... G10L 17/22 705/5 |
| 2013/0275873 | A1 | 10/2013 | Shaw et al. |
| 2014/0282586 | A1 | 9/2014 | Shear et al. |
| 2014/0343950 | A1 | 11/2014 | Simpson et al. |
| 2015/0142435 | A1 | 5/2015 | Kumar et al. |
| 2015/0348551 | A1 | 12/2015 | Gruber et al. |
| 2016/0193732 | A1 | 7/2016 | Breazeal et al. |
| 2016/0219078 | A1 | 7/2016 | Porras et al. |
| 2016/0239568 | A1 | 8/2016 | Packer et al. |
| 2017/0277364 | A1 | 9/2017 | Roach et al. |
| 2017/0278514 | A1 | 9/2017 | Mathias et al. |
| 2018/0131642 | A1 | 5/2018 | Trufinescu et al. |
| 2018/0182398 | A1 | 6/2018 | Halstvedt et al. |
| 2018/0307761 | A1 | 10/2018 | Felt et al. |
| 2018/0308476 | A1 | 10/2018 | Hirzel et al. |
| 2019/0027131 | A1 | 1/2019 | Zajac, III |
| 2019/0130904 | A1 | 5/2019 | Homma et al. |
| 2019/0180343 | A1* | 6/2019 | Arnett ................ G06Q 30/0633 |
| 2019/0278562 | A1 | 9/2019 | Tang |
| 2019/0311718 | A1 | 10/2019 | Huber et al. |
| 2019/0325864 | A1 | 10/2019 | Anders et al. |
| 2019/0340200 | A1 | 11/2019 | Coimbra et al. |
| 2019/0347842 | A1 | 11/2019 | Henry et al. |
| 2020/0033981 | A1 | 1/2020 | Popovich et al. |
| 2020/0103978 | A1 | 4/2020 | Mixter et al. |
| 2020/0202853 | A1 | 6/2020 | Ramie et al. |
| 2020/0258509 | A1 | 8/2020 | Bharadwaj |
| 2020/0294497 | A1 | 9/2020 | Kirazci et al. |
| 2020/0341546 | A1 | 10/2020 | Yuan et al. |
| 2020/0342223 | A1 | 10/2020 | Mixter et al. |

FOREIGN PATENT DOCUMENTS

| | | |
|---|---|---|
| JP | 2002318132 | 10/2022 |
| KR | 20160003138 | 1/2016 |
| WO | 2011088053 | 7/2011 |
| WO | 2018034028 A1 | 3/2019 |

OTHER PUBLICATIONS

Korean Patent Office; Office Action issued in Application No. KR10-2020-7033522; 20 pages; dated Apr. 13, 2022.
European Patent Office; Decision to Refuse issued in Application No. 18729841.9, 17 pages, dated May 30, 2022.
European Patent Office; Summons to attend oral proceedings pursuant to Rule 115(1) EPC issued for Application No. 18729841.9; 11 pages; dated Oct. 25, 2021.
European Patent Office: Examination Report issued for Application No. 18729841.9 dated Sep. 25, 2020.
United States Patent Office; Office Action issue in U.S. Appl. No. 16/240,609; 23 pages; dated Aug. 14, 2020.
United States Patent and Trademark Office: Office Action issued for U.S. Appl. No. 16/269,275 dated Jul. 8, 2020.
https://www.the-ambient.com/features/amazon-echo-vs-amazon-echo-show-157; retrieved Jan. 4, 2019; 7 pages. Jan. 4, 2019.
Nield, David, "How to Control Your Computer with Your Voice," Popular Science, https://www.popsci.com/control-your-computer-with-your-voice, 5 pages Apr. 24, 2018.
Windows Help, "Use Speech Recognition Applies to: Windows 10," https://support.microsoft.com/en-us/help/17208/windows-10-use-speech-recognition. 2 pages. Apr. 2018.
Bajpei, A. et al. "Voice Operated Web Browser," International Journal of Soft Computing and Atrificial Intelligence, ISSN: 2321-104X, vol. 3, Issue-1. 3 pages May 2015.
Opera Tutorials, Talking to Opera, "Using Opera with Voice," https://www.opera.com/help/tutorials/voice/using/ 3 pages 2018.
Technorms.com, Tiffiny, "Using Voice Commands in Chrome Makes Surfing a Breeze, Here's How to Set It Up," https://www.technorms.com/19067/voice-commands-chrome. 7 pages. 2018.
Rouse, M., "Android WebView," SearchSecurity.com, https://searchsecurity.techtarget.com/definition/Android-Webview?vgnextfmt=print. 1 page Apr. 17, 2015.
Kurlander, D. "Persona: An Architecture for Animated Agent Interfaces", Retrieved from Internet: URL:https://pdfs.semanticscholar.org/51b7/183377092be7549c077323e2cb86479bef99.pdf Mar. 6, 1998.
International Search Report and Written Opinion of PCT Ser. No. PCT/US2018/031444, 17 pages, dated Aug. 8, 2018.
United States Patent Office; First Action Interview Pilot Program Pre-Interview Communication Issued in U.S. Appl. No. 15/774,950; 16 pages; dated Jul. 17, 2020.
Japan Patent Office; Notice of Reasons for Rejection issued in application No. 2020-562767, 13 pages, dated Jan. 31, 2022.
European Patent Office; Preliminary Opinion issued in EP18729841.9; 11 pages; dated Feb. 16, 2022.
Intellectual Property India; Examination Report issued in Application No. 202027050427; 6 pages; dated Dec. 10, 2021.
Japanese Patent Office; Decision of Rejection issued in app. No. 2020-562767, 4 pages, dated Aug. 8, 2022.

* cited by examiner

MULTI-MODAL INTERACTION BETWEEN USERS, AUTOMATED ASSISTANTS, AND OTHER COMPUTING SERVICES

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands, queries, and/or requests (collectively referred to herein as "queries") using free form natural language input which may include vocal utterances converted into text and then processed and/or typed free form natural language input. In many cases, the automated assistant must first be "invoked," e.g., using predefined oral invocation phrases.

Many computing services (also referred to as "software agents" or "agents") exist that are capable of interacting with automated assistants. These computing services are often developed and/or provided by what will be referred to herein as "third parties" (or "third party developers") because the entity providing a computing service is often not directly affiliated with an entity that provides the automated assistant. However, computing services are not limited to those developed by third parties, and may be implemented by the same entity that implements the automated assistant. Computing services may be configured to resolve a variety of different user intents, many of which might not be resolvable by automated assistants. Such intents may relate to, but are of course not limited to, controlling or configuring smart devices, receiving step-by-step instructions for performing tasks, and interacting with online services. Accordingly, many automated assistants may interact with both users and third party computing services simultaneously, effectively acting as a mediator or intermediary between the users and the third party.

Some third party computing services may operate in accordance with dialog state machines that effectively define a plurality of states, as well as transitions between those states, that occur based on various inputs received from the user and/or elsewhere (e.g., sensors, web services, etc.). As a user provides (through an automated assistant as mediator) free form natural language input (vocally or typed) during one or more dialog "turns" with a third party computing service, a dialog state machine associated with the third party computing service advances between various dialog states. Eventually, the dialog state machine may reach a state at which the user's intent is resolved.

SUMMARY

As automated assistants become more ubiquitous, computing devices specifically designed to facilitate interaction with automated assistants—referred to herein as "assistant devices"—are becoming more commonplace. Many assistant devices enable users to engage in touch-free interaction with automated assistants. For example, assistant devices often include microphones that allow users to provide vocal utterances as input. Additionally, more and more assistant devices now include display capabilities.

Accordingly, techniques and a framework are described herein for multi-modal interaction between users, automated assistants, and other computing services. More particularly, but not exclusively, some implementations described herein allow for users to advance through dialog state machines associated with third party computing services using input modalities other than verbal free form natural language input, such as visual/tactile modalities. As used herein, "verbal" will refer to free-form natural language input that can be provided by a user by interacting with a keyboard and/or by providing a vocal utterance (which may be converted to textual content using speech recognition). Additionally or alternatively, some implementations described herein allow for users to trigger touchless interaction with graphical user interfaces associated with third party computing services. Other variations are contemplated herein. The provision of a mechanism for enabling users to interact with third party services using a combination of both verbal and non-verbal inputs may facilitate access to the third party services by both able-bodied users and users with a wide range of disabilities (and may reduce the need for specially-adapted versions of the service). This is not least because the mechanism may enable users to interact with the third party service in the manner which is most appropriate for them.

In some implementations, an automated assistant may include a client portion and a server portion. The client portion of the automated assistant may operate on a client device (e.g., a smart phone, smart watch, assistant device, etc.) as an "assistant app." The server portion of the automated assistant may operate on one or more servers that are sometimes referred to herein as a "cloud" computing system or "the cloud." In various implementations, the client device may include a display that is used, e.g., by the client portion of the automated assistant, to render a graphical user interface ("GUI"). In some implementations, the GUI may take the form of an embedded web browser that renders graphics based on underlying markup language (e.g., HTML, XML) provided by a third party computing service. The provision of a GUI may enable the user to interact with the third party computing service in a more efficient manner than may be possible through audio interaction alone.

In some implementations where the user is engaging with the automated assistant in order to further engage with a third party computing service, the third party computing service may engage with a user in accordance with a verbal dialog state machine and/or a visual dialog state machine. The verbal dialog state machine may govern a verbal dialog between the user and the computing service in which the user provides typed and/or vocal free form natural language input. The visual dialog state machine may govern what is rendered on the GUI as part of the immersive experience. In some such implementations, one or more verbal dialog states of the verbal dialog state machine may be linked to one or more visual dialog states of the visual dialog state machine, such that a particular GUI is rendered when the verbal dialog reaches a particular state, and/or the verbal dialog automatically advances to a particular state when a user interacts with the GUI in a particular way to advance the visual dialog state machine to a particular visual dialog state.

In some implementations, a user may be able to touchlessly interact with the GUI provided by the third party computing service using verbal commands or other touchless input (indicative of an intent of the user) that are funneled through the server portion of the automated assistant. For example, suppose the user engages (through the automated assistant) with a third party computing service that allows control of a smart home device. Various options relating to controlling/configuring the smart home device may be presented on the GUI, e.g., within multiple tiles of the GUI. In addition to being able to select one of the tiles (e.g., using a mouse or touchscreen), the user also can select one of the tiles by issuing a verbal command, such as "Let's configure my device" or "I need help." This may trigger a touchless interaction with the GUI that progresses to an interface module which allows the user to configure the device or which provides a list of selectable FAQs. As another example, a user may scroll through a document rendered as part of the GUI by issuing a verbal command, such as "scroll down one screen" or "move to the next paragraph." In addition to funneling verbal commands/other touchless inputs to the third party computing service through the server portion of the automated assistant, all data and commands from the third party computing service to the client device may be channeled via the server portion of the automated assistant. This may serve to increase the security of the client device since the server portion of the automated assistant may prevent nefarious messages and the like, which originate from or are received via the third party computing services, from reaching the client device.

In some implementations, a user may interact with the GUI provided by the third party computing service in order to advance through both the visual dialog state machine and the verbal dialog state machine. As an example, a user may operate the GUI to zoom in on a particular object, and then provide a verbal query such as "What's this?" By focusing the GUI in on the particular object, the user also advances the verbal state machine to a state in which the particular object is in focus. Consequently, the term "this" in the query "What's this?" may be resolved to the particular object.

As another example, suppose a third party computing service provides a multiple-choice turn-based dialog (e.g., relating to step-by-step guidance for performing a task). For a particular question, a GUI rendered at the client computing device may correspond to a particular state of the third party computing service's visual dialog state machine, and may include the multiple-choice question and the answer choices. At the same time, verbal natural language output may be provided in accordance with the third party computing service's verbal dialog state machine. The verbal natural language output may, for instance, read aloud the multiple-choice question (and in some cases, go through the answer choices as well). In some implementations, the user may advance both the visual and verbal dialog state machines to different respective states (e.g., to the next question) by either selecting one of the answer choices on the screen, or by providing a vocal utterance that indicates a particular answer choice.

Techniques described herein may give rise to a variety of technical advantages and benefits. As one example, interpreting and/or performing intent matching based on free form input ties up considerable computing resources. By enabling users to tactilely interact with predefined graphical elements to advance conversation with an automated assistant, these resources may be conserved, both from not having to perform the interpretation/intent matching and by enabling efficient traversal of dialog state machines associated with third party computing services. Such wastage or otherwise inefficient or unnecessary use of power and computing resources may occur at the client computing device itself and/or at a remote computing apparatus, such as one or more network servers operating the server portions of automated assistants. In addition, unnecessary communication with a remote computing apparatus causes unwanted load on the communication network. As another example, by embedding a platform-agnostic web browser into a client portion of an automated assistant, third party developers are able to provide visual content to accompany their computing services in a uniform manner. This may enable the computing services and the visual content to be provided across a wide range of the client devices, without requiring the mechanism/process to be specifically configured for the particular client device.

In some implementations, a system is provided that includes at least one client computing device. The client computing device has a display and implements a client portion of an automated assistant. The system further includes one or more server computing devices that implement a server portion of the automated assistant. A user interacts with the client portion to participate in a human-to-computer dialog session between the user, the automated assistant, and a third party computing service. The third party computing service engages with the user in accordance with a verbal dialog state machine and a visual dialog state machine. The client portion of the automated assistant is configured to receive, from the third party computing service by way of the server portion of the automated assistant, data indicative of a first visual dialog state of the visual dialog state machine. The client portion of the automated assistant is further configured to render, on the display based on the first visual dialog state, a graphical user interface associated with the human-to-computer dialog session. The graphical user interface includes at least one graphical element that is operable to cause the verbal state machine to transition from a first verbal dialog state corresponding to the first visual dialog state to a second verbal dialog state. The client portion of the automated assistant is further configured to detect operation of the at least one graphical element by the user. The client portion of the automated assistant is further configured to provide, to the server portion of the automated assistant, data indicative of operation of the at least one graphical element. The server portion of the automated assistant is configured to provide the data indicative of operation of the at least one graphical element to the third party computing service. The data indicative of operation of the at least one graphical element causes the third party computing service to transition from the first verbal dialog state to the second verbal dialog state.

These and other implementations of technology disclosed herein may optionally include one or more of the following features.

In some implementations, the server portion of the automated assistant may be further configured to receive, from the third party computing service, data indicative of the second verbal dialog state, and provide, to the client portion of the automated assistant, the data indicative of the second verbal dialog state. In some implementations, the data indicative of the second verbal dialog state may include text or audio data. In some of those implementations, the client device may be further configured to, in response to receiving the data indicative of the second verbal dialog state, convert the text to speech and audibly render the speech, or audibly render the audio data.

In some implementations, provision of the data indicative of operation of the at least one graphical element from the server portion of the automated assistant to the third party computing service may cause the third party computing service to transition from the first visual dialog state to a second visual dialog state. In some of those implementations, the second visual dialog state may correspond to the second verbal dialog state. In some of those implementations, the client portion of the automated assistant may be further configured to receive, from the third party computing service by way of the server portion of the automated assistant, data indicative of the second visual dialog state, and render, on the display based on the second visual dialog state, an updated graphical user interface associated with the human-to-computer dialog session. In some of those implementations, the data indicative of the second visual dialog state may cause the client device to automatically perform a touchless interaction to render the updated graphical user interface. In some of those implementations, the touchless interaction may include one or multiple of: operation of a selectable element of the graphical user interface, scrolling to a particular position of a document rendered in the graphical user interface, and zooming in on a portion of the graphical user interface.

In some implementations, after the third party computing service has transitioned from the first verbal dialog state to the second verbal dialog state, the client portion of the automated assistant may be further configured to receive, from the user at one or more input components of the client computing device, vocal free form input, provide, to the server portion of the automated assistant, data indicative of the vocal free form input, and receive, from the server portion of the automated assistant, data indicative of a display context. The server portion of the automated assistant may obtain the data indicative of the display context from the third party computing service based on providing the third party computing service with the data indicative of the vocal free form input, or with additional data that is based on the data indicative of the vocal free form input. The third party computing service may generate the data indicative of the display context based on the received data or additional data, and based on the transitioned to second verbal dialog state. The client portion of the automated assistant may be further configured to, based on the received display context, trigger a touchless interaction at the graphical user interface.

In some implementations, the touchless interaction may include one or multiple of: operation of a selectable element of the graphical user interface, scrolling to a particular position of a document rendered in the graphical user interface, and zooming in on a portion of the graphical user interface.

In some implementations, a system is provided that includes at least one client computing device and one or more server computing devices. The client computing device has a display and implements a client portion of an automated assistant. The system further includes one or more server computing devices that implement a server portion of the automated assistant. A user interacts with the client portion to participate in a human-to-computer dialog session between the user, the automated assistant, and a third party computing service. The client portion of the automated assistant is configured to render, on the display of the client computing device, a graphical user interface associated with the human-to-computer dialog session. The client portion of the automated assistant is further configured to receive, from the user at one or more input components of the client computing device, vocal free form input. The client portion of the automated assistant is further configured to provide, to the server portion of the automated assistant, data indicative of the vocal free form input. The client portion of the automated assistant is further configured to receive, from the server portion of the automated assistant, data indicative of a display context. The client portion of the automated assistant is further configured to, based on the display context, trigger a touchless interaction between the user and the graphical user interface. The server portion of the automated assistant is configured to determine an intent of the user based on the data indicative of the vocal free form input. The server portion of the automated assistant is further configured to provide data indicative of the intent to the third party computing service. The data indicative of the intent causes the third party computing service to resolve the intent to generate resolution information. The server portion of the automated assistant is further configured to receive, from the third party computing service in response to provision of the data indicative of the intent, the display context. The display context is maintained for the third party computing service in association with the human-to-computer dialog session and is updated based at least in part on one or both of the intent of the user and the resolution information.

These and other implementations of technology disclosed herein may optionally include one or more of the following features.

In some implementations, the graphical user interface may include a web browser embedded into the client portion of the automated assistant. In some implementations, the touchless interaction may include one or multiple of: operation of a selectable element of the graphical user interface, scrolling to a particular position of a document rendered in the graphical user interface, and zooming in on a portion of the graphical user interface.

In some implementations, a method performed by one or more processors is provided that includes, at a client device having a display, implementing a client portion of an automated assistant. The method further includes, at one or more server computing devices, implementing a server portion of the automated assistant. A user interacts with the client portion to participate in a human-to-computer dialog session between the user, the automated assistant, and a third party computing service. The third party computing service engages with the user in accordance with a verbal dialog state machine and a visual dialog state machine. The method further includes receiving, at the client portion, from the third party computing service by way of the server portion of the automated assistant, data indicative of a first visual dialog state of the visual dialog state machine. The method further includes rendering, by the client portion, on the display based on the first visual dialog state, a graphical user interface associated with the human-to-computer dialog session. The graphical user interface includes at least one graphical element that is operable to cause the verbal state machine to transition from a first verbal dialog state corresponding to the first visual dialog state to a second verbal dialog state. The method further includes detecting, by the client portion, operation of the at least one graphical element by the user. The method further includes providing, by the client portion to the server portion of the automated assistant, data indicative of operation of the at least one graphical element. The method further includes providing, by the server portion, the data indicative of operation of the at least one graphical element to the third party computing service. The data indicative of operation of the at least one graphical element causes the third party computing service to transition from the first verbal dialog state to the second verbal dialog state These and other implementations of technology disclosed herein may optionally include one or more of the following features.

In some implementations, the method may further include receiving, by the server portion, from the third party computing service, data indicative of the second verbal dialog state, and providing, by the server portion, to the client portion of the automated assistant, the data indicative of the second verbal dialog state. In some implementations, provision of the data indicative of operation of the at least one graphical element from the server portion of the automated assistant to the third party computing service may cause the third party computing service to transition from the first visual dialog state to a second visual dialog state.

In some implementations, a method performed by one or more processors is provided that includes receiving, by a computing service implemented at least in part by the one or more processors, from an automated assistant, data indicative of an intent of a user of a computing device in communication with the automated assistant as part of a human-to-computer dialog session between the user and the automated assistant. The method further includes resolving the intent of the user to generate resolution information. The method further includes updating a display context maintained for the computing service in association with the human-to-computer dialog session. The updating is based at least in part on one or both of the intent and the resolution information. The method further includes providing data indicative of the display context to the automated assistant. The data indicative of the display context is provided by the automated assistant to the computing device and causes an assistant application executing on the computing device to trigger a touchless interaction between the user and a graphical user interface of the assistant application.

These and other implementations of technology disclosed herein may optionally include one or more of the following features.

In some implementations, the graphical user interface may include a web browser embedded in the assistant application. In some implementations, the touchless interaction may include one or multiple of: operation of a selectable element of the graphical user interface, scrolling to a particular position of a document rendered in the graphical user interface, and zooming in on a portion of the graphical user interface. In some of those implementations, the data indicative of the intent of the user may include speech recognition output of vocal free form input provided by the user at the computing device. In some implementations, the method may further include determining, by the computing service, the intent of the user based on the speech recognition output.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s))) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
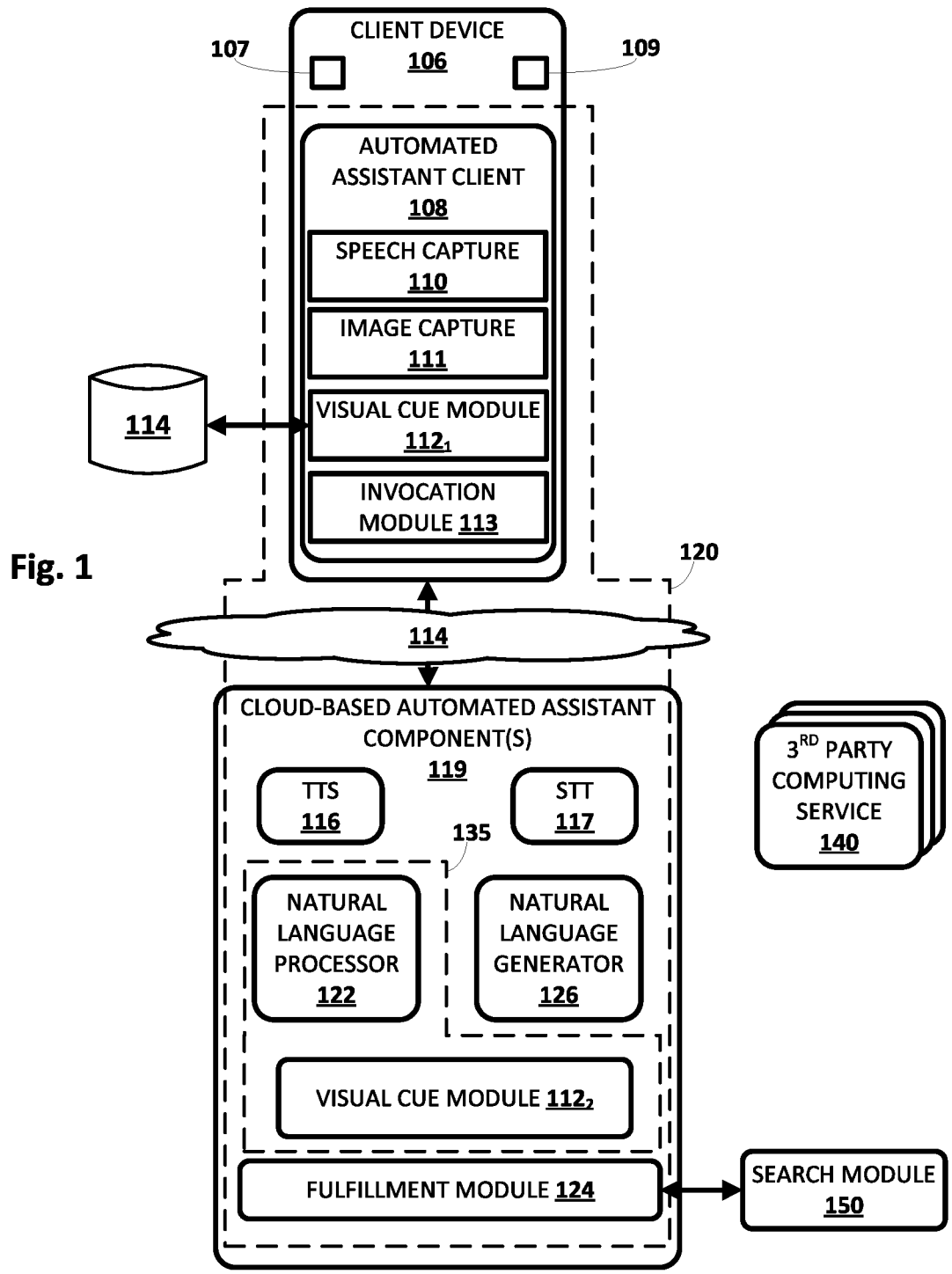
FIG. 1 is a block diagram of an example environment in which implementations disclosed herein may be implemented.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 114.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120.

In some implementations, client device 106 may be equipped with one or more vision sensors 107 having one or more fields of view, although this is not required. Vision sensor(s) 107 may take various forms, such as digital cameras, passive infrared ("PIR") sensors, stereoscopic cameras, RGBd cameras, etc. The one or more vision sensors 107 may be used, e.g., by an image capture module 111, to capture image frames (still images or video) of an environment in which client device 106 is deployed. These image frames may then be analyzed, e.g., by a visual cue module $112_1$, to detect user-provided visual cues contained in the image frames. These visual cues may include but are not limited to hand gestures, gazes towards particular reference points, facial expressions, predefined movements by users, etc. These detected visual cues may be used for various purposes, such as invoking automated assistant 120 and/or causing automated assistant 120 to take various actions.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation phrase, such as "OK, Assistant," or "Hey, Assistant," to cause automated assistant 120 to begin actively listening or monitoring typed text. Additionally or alternatively, in some implementations, automated assistant 120 may be invoked based on one or more detected visual cues, alone or in combination with verbal invocation phrases.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may utilize speech recognition to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108, or "client portion" of automated assistant 120. In various implementations, automated assistant client 108 may include a speech capture module 110, the aforementioned image capture module 111, a visual cue module $112_1$, and/or an invocation module 113. In other implementations, one or more aspects of speech capture module 110, image capture module 111, visual cue module $112_1$, and/or invocation module 113 may be implemented separately from automated assistant client 108, e.g., by one or more cloud-based automated assistant components 119. For example, in FIG. 1, there is also a cloud-based visual cue module $112_2$ that may detect visual cues in image data.

In various implementations, speech capture module 110, which may be implemented using any combination of hardware and software, may interface with hardware such as a microphone 109 or other pressure sensor to capture an audio recording of a user's utterance(s). Various types of processing may be performed on this audio recording for various purposes. In some implementations, image capture module 111, which may be implemented using any combination of hardware or software, may be configured to interface with camera 107 to capture one or more image frames (e.g., digital photographs) that correspond to a field of view of the vision sensor 107.

In various implementations, visual cue module $112_1$ (and/or cloud-based visual cue module $112_2$) may be implemented using any combination of hardware or software, and may be configured to analyze one or more image frames provided by image capture module 111 to detect one or more visual cues captured in and/or across the one or more image frames. Visual cue module $112_1$ may employ a variety of techniques to detect visual cues. For example, in FIG. 1, visual cue module $112_1$ is communicatively coupled with a visual cue model database 114 (which may be integral with client device 106 and/or hosted remotely from client device 106, e.g., in the cloud). Visual cue model database 114 may include, for instance, one or more artificial intelligence (or machine learning) models that are trained to generate output indicative of detected user-provided visual cues in image frames.

Speech capture module 110 may be configured to capture a user's speech, e.g., via a microphone 109, as mentioned previously. Additionally or alternatively, in some implementations, speech capture module 110 may be further configured to convert that captured audio to text and/or to other representations or embeddings, e.g., using speech-to-text ("STT") processing techniques. Additionally or alternatively, in some implementations, speech capture module 110 may be configured to convert text to computer-synthesized speech, e.g., using one or more voice synthesizers. However, because client device 106 may be relatively constrained in terms of computing resources (e.g., processor cycles, memory, battery, etc.), speech capture module 110 local to client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based text-to-speech ("TTS") module 116 and/or a cloud-based STT module 117.

In various implementations, invocation module 113 may be configured to determine whether to invoke automated assistant 120, e.g., based on output provided by speech capture module 110 and/or visual cue module $112_1$ (which in some implementations may be combined with image capture module 111 in a single module). For example, invocation module 113 may determine whether a user's utterance qualifies as an invocation phrase that should initiate a human-to-computer dialog session with automated assistant 120. In some implementations, invocation module 113 may analyze data indicative of the user's utterance, such as an audio recording or a vector of features extracted from the audio recording (e.g., an embedding) in conjunction with one or more visual cues detected by visual cue module $112_1$. In some implementations, a threshold that is employed by invocation module 113 to determine whether to invoke automated assistant 120 in response to a vocal utterance may be lowered when particular visual cues are also detected. Consequently, even when a user provides a vocal utterance that is different from but somewhat phonetically similar to the proper invocation phrase, "OK assistant," that utterance may nonetheless be accepted as a proper invocation when detected in conjunction with a visual cue (e.g., hand waving by the speaker, speaker gazes directly into vision sensor 107, etc.).

In some implementations, an on-device invocation model may be used by invocation module 113 to determine whether an utterance and/or visual cue(s) qualify as an invocation. Such an on-device invocation model may be trained to detect variations of invocation phrases/gestures. For example, in some implementations, the on-device invocation model (e.g., one or more neural networks) may be trained using training examples that each include an audio recording (or an extracted feature vector) of an utterance from a user, as well as data indicative of one or more image frames and/or detected visual cues captured contemporaneously with the utterance.

Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally.

Cloud-based STT module 117 may be configured to leverage the virtually limitless resources of the cloud to convert audio data captured by speech capture module 110 into text, which may then be provided to natural language understanding module 135. In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected visual cues. For example, suppose two candidate textual interpretations have similar confidence scores. With conventional automated assistants 120, the user may be asked to disambiguate between these candidate textual statements. However, with automated assistants 120 configured with selected aspects of the present disclosure, one or more detected visual cues may be used to "break the tie."

Automated assistant 120 (and in particular, cloud-based automated assistant components 119) may include intent matcher 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud).

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

An intent matcher 135 may be configured to determine a user's intent based on input(s) (e.g., vocal utterances, visual cues, etc.) provided by the user and/or based on other signals, such as sensor signals, online signals (e.g., data obtained from web services), and so forth. In some implementations, intent matcher 135 may include a natural language processor 122 and the aforementioned cloud-based visual cue module $112_2$. In various implementations, cloud-based visual cue module $112_2$ may operate similarly to visual cue module $112_1$ except that cloud-based visual cue module $112_2$ may have more resources at its disposal. In particular, cloud-based visual cue module $112_2$ may detect visual cues that may be used by intent matcher 135, alone or in combination with other signals, to determine a user's intent.

Natural language processor 112 may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node, which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Intent matcher 135 may use various techniques to determine an intent of the user, e.g., based on output from natural language processor 122 (which may include annotations and terms of the natural language input) and/or based on output from visual cue module (e.g., $112_1$ and/or $112_2$). In some implementations, intent matcher 135 may have access to one or more databases (not depicted) that include, for instance, a plurality of mappings between grammars, visual cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?"

In addition to or instead of grammars, in some implementations, intent matcher 135 may employ one or more trained machine learning models, alone or in combination with one or more grammars and/or visual cues. These trained machine learning models may also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual cues detected by visual cue modules $112_{1-2}$. For example, a user could utter something like "Order me this many cat bowls" while holding up three fingers to visual sensor 107 of client device 106. Or, a user could utter something like "Find me more movies like this" while holding of a DVD case for a particular movie.

In some implementations, automated assistant 120 may serve as an intermediary between users and one or more third party computing services 140 (or "third party agents", or "agents"). These third party computing services 140 may be independent software processes that receive input and provide responsive output. Some third party computing services may take the form of third party applications that may or may not operate on computing systems that are separate from those that operate, for instance, cloud-based automated assistant components 119. One kind of user intent that may be identified by intent matcher 135 is to engage a third party computing service 140. For example, automated assistant 120 may provide access to an application programming interface ("API") to a service for controlling a smart device. A user may invoke automated assistant 120 and provide a command such as "I'd like to turn the heating on." Intent matcher 135 may map this command to a grammar that triggers automated assistant 120 to engage with the third party service, thereby to cause the user's heating to be switched on. The third party service may provide automated assistant 120 with a minimum list of slots that need to be filled in order to fulfill (or "resolve") a command to turn the heating on. In this example, the slots may include the temperature to which the heating is to be set, and a duration for which the heating is to be on. Automated assistant 120 may generate and provide to the user (via client device 106) natural language output that solicits parameters for the slots.

Fulfillment module 124 may be configured to receive the predicted/estimated intent that is output by intent matcher 135, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or "resolution information") to be generated/obtained, e.g., by fulfillment module 124. As will be described below, the fulfillment information may in some implementations be provided to a natural language generator ("NLG" in some FIGS.) 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oreg." This responsive information may form part of the fulfillment information generated by fulfillment module 124.

Additionally or alternatively, fulfillment module 124 may be configured to receive, e.g., from natural language understanding module 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Figure 2:
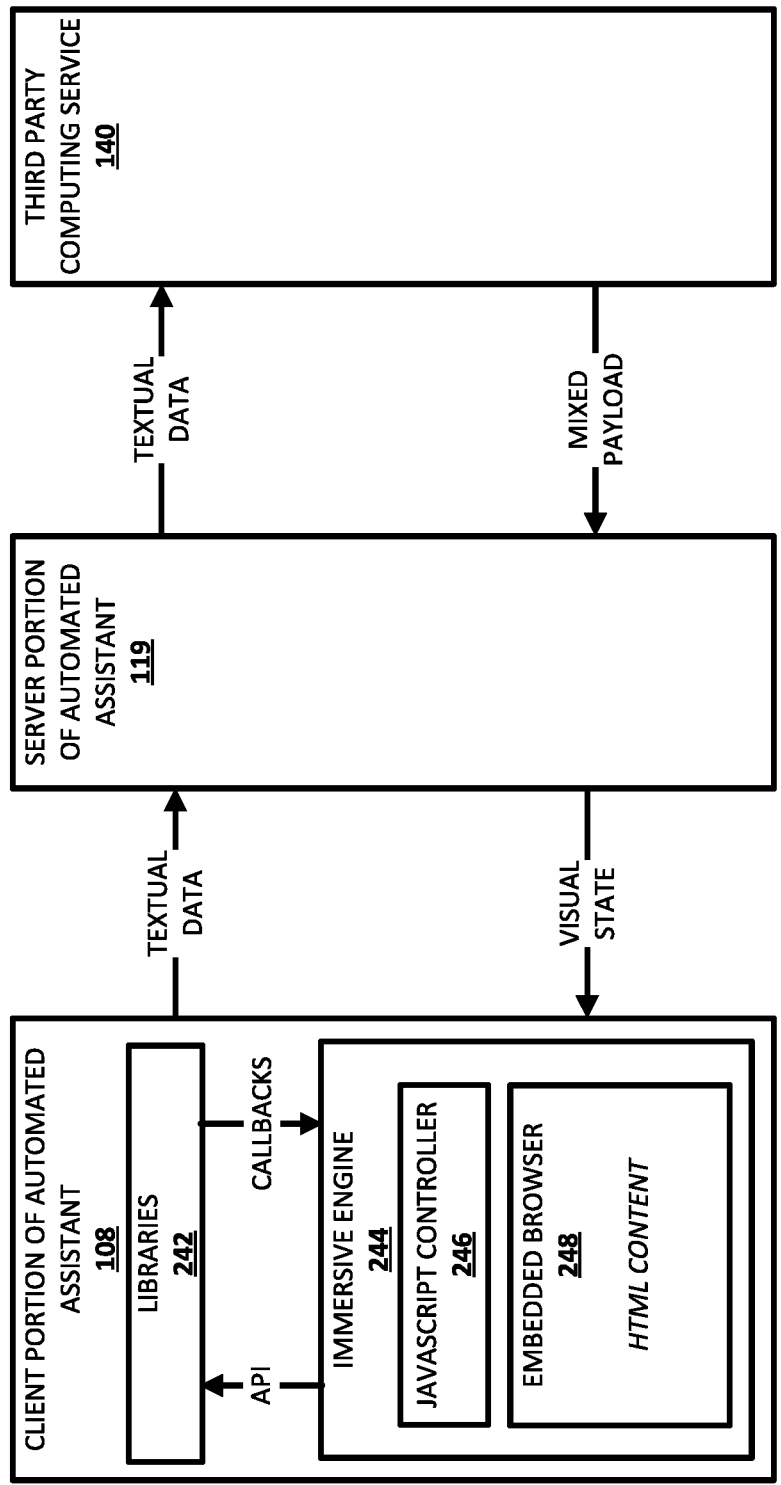
FIG. 2 depicts an example of components that may be implemented in a client portion of an automated assistant, in accordance with various implementations.

FIG. 2 schematically demonstrates one example of how a client portion 108 of automated assistant 120 (also referred to as "automated assistant client" in FIG. 1) may be configured to facilitate multi-modal interaction between users, automated assistant 120, and third party computing services 140. In FIG. 2, client portion 108 includes one or more libraries 242 that may include, for instance, a library specific to automated assistant 120 (e.g., libassistant), a cast companion library ("CCL"), and/or other libraries that facilitate data exchange with an immersive engine 244 of client portion 108.

Immersive engine 244 may implement a variety of different technologies, such as HTML5 (including HTML, CSS, and JavaScript), CSS cards, and so forth to provide visual output to a user who engages with a third party computing service (and hence, to provide a more immersive user experience). In various implementations, immersive engine 244 may include various components, such as a JavaScript controller 246 (or other similar controllers) and an embedded browser 248. In various implementations, embedded browser 248 may be rendered as a GUI, e.g., on a screen associated with client device 106. The GUI may include information associated with a human-to-computer dialog involving a user, automated assistant 120, and a third party computing service 140. For example, in some implementations, third party computing service 140 may provide, e.g., via server portion 119 of automated assistant 120, markup language data such as HTML, XML, CSS, etc., which is provided by immersive engine 244 to embedded browser 248 for visual rendition. Embedded browser 248 may be implemented using a variety of different technologies, such as webviews (e.g., for the Android® operating system, for the iOS® operating system), iframes, and so forth.

Following the arrows of FIG. 2, first, a user may provide verbal free form input to client portion 108. This input may be typed or spoken. In the latter case the spoken input may be analyzed to generate textual speech recognition output. Whichever the case, data indicative of the free form input, such as textual data, may be provided by client portion 108 to server portion 119. In some implementations, server portion 119 may itself attempt to determine the user's intent based on this textual data. Additionally or alternatively, in some implementations, server portion 119 may relay the textual data to third party computing service 140, so that third party computing service 140 can attempt to ascertain the user's intent.

Once the user's intent is ascertained (whether by server portion 119 or third party computing service 140), third party computing service 140 may resolve the user's intent, e.g., by taking a responsive action (e.g., turning the user's heating on). Additionally, one or more dialog state machines associated with third party computing service 140 may transition between various states. For example, a visual dialog state machine may be transitioned from one visual dialog state to another, and a verbal dialog state machine may also be transitioned from one verbal dialog state to another.

As described above, resolution of the user's intent may cause fulfillment or resolution information to be generated. This resolution information may be provided by third party computing service 140 to server portion 119, e.g., as part of a mixed payload. The resolution information may be used, e.g., by server portion 119, to perform various actions, such as generating natural language output. In some implementations, in addition to the resolution information, the mixed payload may also include data indicative of the transitioned-to visual dialog state, such as markup language (e.g., HTML, XML), or a command to interact with an existing GUI in a particular way (e.g., zoom in/out, scroll down, focus on particular item, etc.). Through provision of a command to interact with an existing GUI in a particular way, the third party computing service 140 can control the client portion 108 by causing the client portion to implement the command to cause the interaction with the existing GUI.

In various implementations, server portion 119 may forward at least some of the mixed payload to client portion 108. For example, in FIG. 2, server portion 119 provides data indicative of a transitioned-to visual state to client portion 108. Client portion 108, e.g., by way of immersive engine 244, may then update a GUI rendered by embedded browser 248 based on the received visual state data. For example, where the mixed payload includes a command to interact with an existing GUI in a particular way, the immersive engine 244 can cause the command to be implemented and, as a result, the GUI, rendered by embedded browser 248, to be updated. By utilizing commands to interact with an existing GUI instead of the provision of data representing the updated view of the GUI, the data that needs to be transferred between the client device and the third party computing service 140 in order to allow the GUI to be updated may be reduced.

Figure 3:
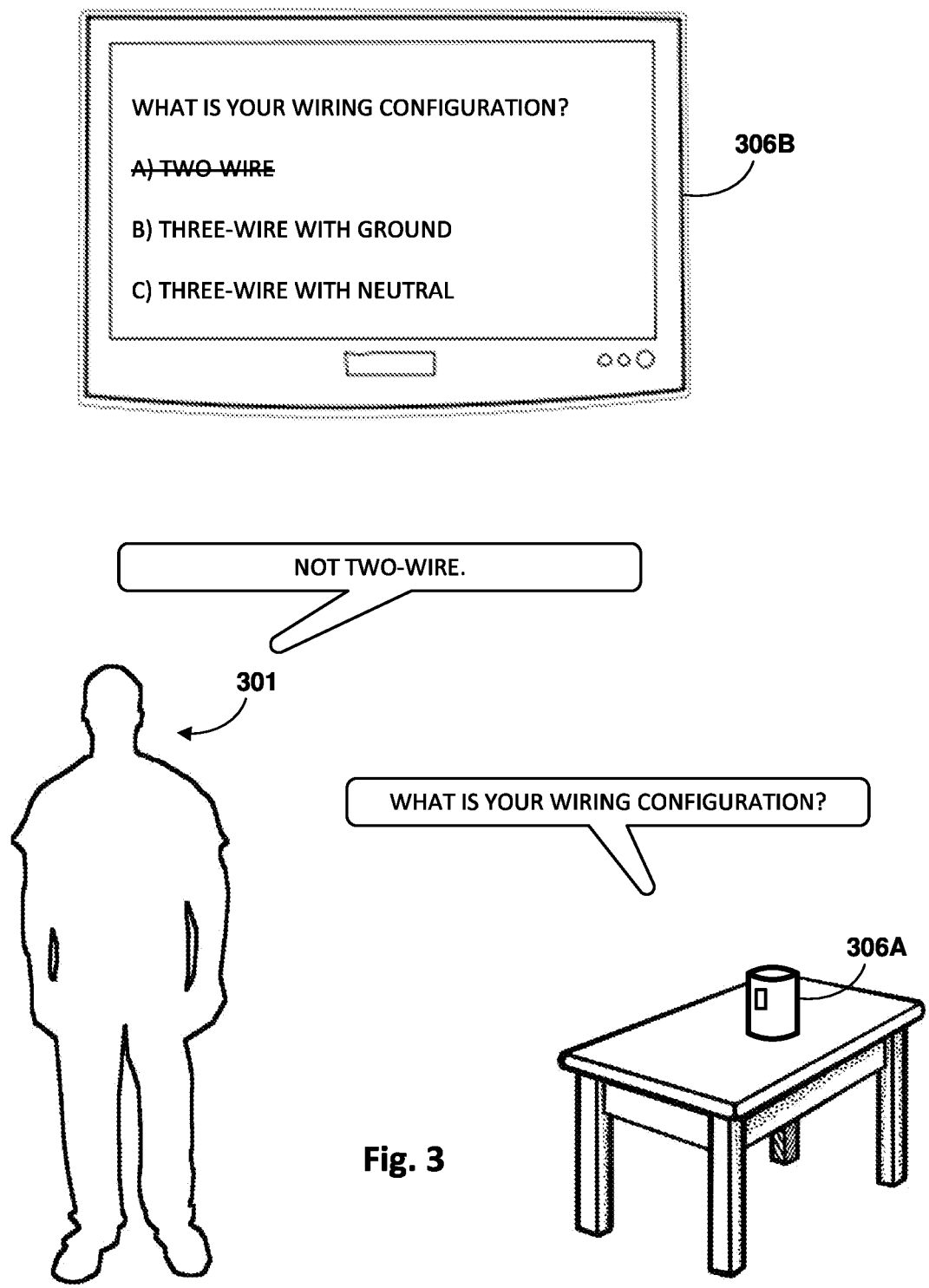
FIGS. 3 and 4 depict an example of how techniques described herein may be employed in one scenario.
Figure 4:
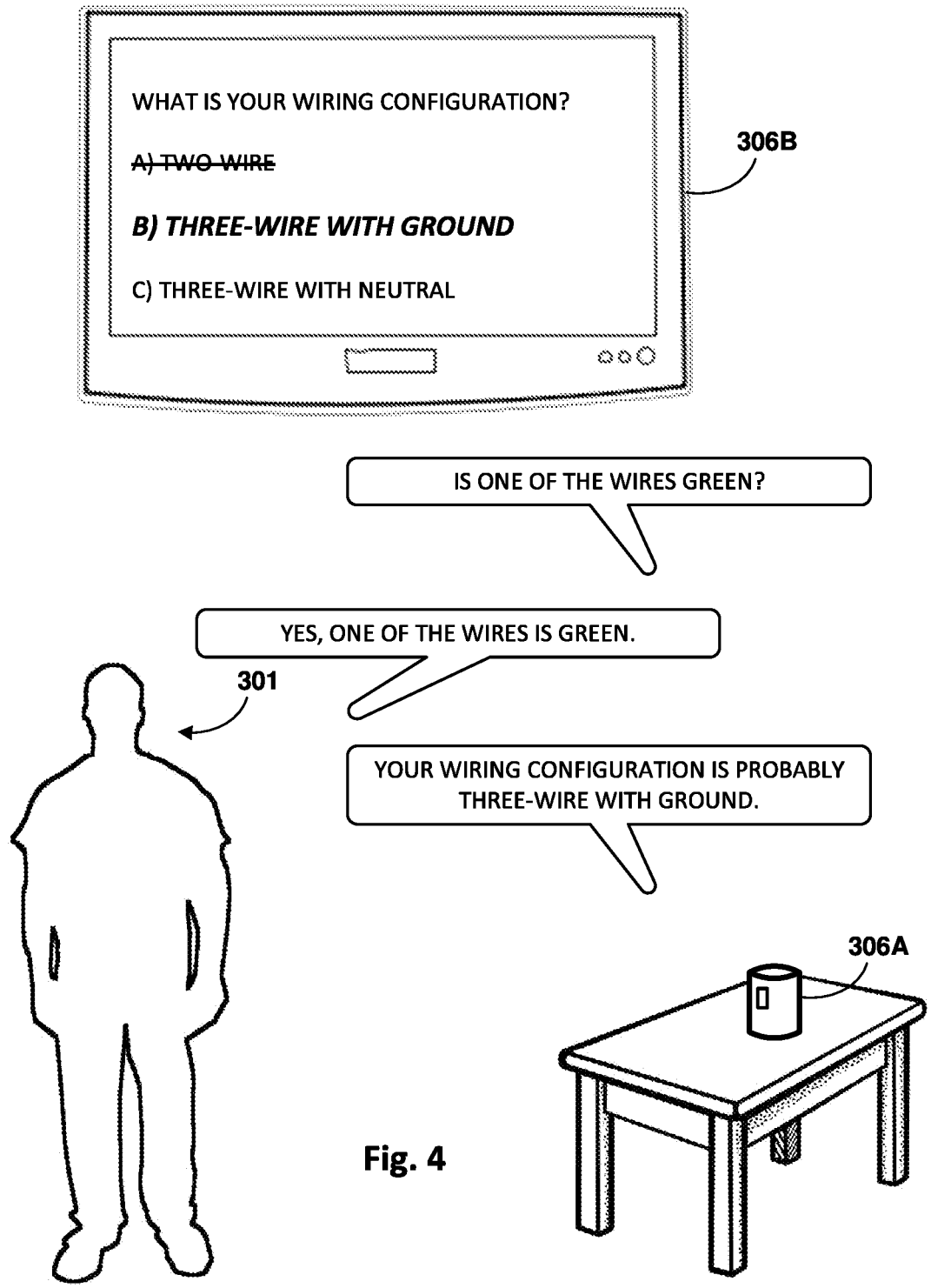

FIGS. 3 and 4 depict one example of how techniques described herein may be employed in a particular scenario. A user 301 operates a first client device 306A taking the form of a standalone interactive speaker to engage with automated assistant 120. In particular, first client device 306A may have an instance of client portion 108 of automated assistant 120 installed. In this example, first client device 306A lacks onboard display capabilities. However, it is in network communication with a second client device 306B in the form of a smart television. In some implementations, a smart television may be made "smart" by virtue of a "smart dongle" with wireless communication capabilities (e.g., Wi-Fi, Bluetooth) being inserted into, for instance, a USB or HDMI slot of the television. Additionally or alternatively, a television may be inherently "smart" by virtue of it having onboard logic that enables it to, for instance, operate another instance of client portion 108 of automated assistant 120. In some implementations, client devices 306A and 306B may be part of the same coordinated "ecosystem" of client devices that are, for instance, associated with an online profile of user 301. In some implementations, an instance of client portion 108 of automated assistant 120 that operates on first client device 306A may "cast" its GUI onto second client device 306B. For example, the instance of client portion 108 operating on first client device 306A may cast embedded browser 248 onto second client device 306B.

In FIG. 3, user 301 is engaging with automated assistant 120 in facilitating wiring of an electrical device such as a thermostat, or a dimmer for a light switch. Audible and visual guidance for wiring the electrical device is provided by a third party computing service by interacting with a client portion 108 of automated assistant 120 operating on first client device 306A. Automated assistant 120 provides vocal output via first client device 306A, asking the user 301 to choose a wiring configuration in his or her home from a list of potential wiring configurations, "What is your wiring configuration?" Meanwhile, automated assistant 120 has caused a GUI provided by the third party computing service to be rendered on second client device 306B. This GUI includes the same wiring configuration question and a series of potential wiring configurations that are candidate answer choices A-C. These candidate answer choices A-C may or may not also be read aloud by automated assistant 120 via first client device 306A. The user 301 eliminates candidate answer choice A by providing the utterance, "Not two-wire." In response to the determination that the candidate answer choice A is incorrect, the third party computing service updates both a verbal dialog state machine and a visual dialog state machine associated with the wiring configurations.

Alternatively, if second client device 306B included a touchscreen and user 301 knew the correct wiring configuration from the candidate answer choices A-C, user 301 could have tapped on his selected answer. In some implementations, the selected answer may be visually emphasized at least temporarily. At any rate, the utterance by user 301 may be recorded and processed using various components described above in association with client portion 108 and server portion 119 of automated assistant 120, and data indicative of the answer provided by user 301 eventually is provided to the third party computing service.

Meanwhile, the third party computing service may, based on the updated state of its visual dialog state machine, provide visual dialog state data (e.g., as part of the mixed payload described with reference to FIG. 2) to server portion 119 of automated assistant 120, which may in turn provide the visual dialog state data to client portion 108 of automated assistant 120. Client portion 108 of automated assistant 120 updates, in response to receiving the visual dialog state data, the GUI rendered on second client device 306B to provide a visual indication that the eliminated answer A) was incorrect (e.g., using strikethrough or other similar visual annotations). However, the user 301 has only eliminated candidate answer choice A and not selected either candidate answer choices B-C.

Referring now to FIG. 4, the third party computing service may, based on the updated state of its verbal dialog state machine, generate resolution data that causes automated assistant 120 to render vocal output, "Is one of the wires green?" The user 301 may respond by providing the utterance, "Yes, one of the wires is green." The third party computing service may then determine the user 301 has a wiring configuration with a ground wire and, based on the updated state of its verbal dialog state machine, generate resolution data that causes automated assistant 120 to render vocal output, "Your wiring configuration is probably three-wire with ground." In response to the determination that the candidate answer choice B is probably correct, the third party computing service may update both a verbal dialog state machine and a visual dialog state machine associated with the potential wiring configurations it provides. Meanwhile, the third party computing service may, based on the updated state of its visual dialog state machine, provide visual dialog state data (e.g., as part of the mixed payload described with reference to FIG. 2) to server portion 119 of automated assistant 120, which may in turn provide the visual dialog state data to client portion 108 of automated assistant 120. Client portion 108 of automated assistant 120 may, in response to receiving the visual dialog state data, update the GUI rendered on second client device 306B to provide a visual indication and that the correct wiring configuration is probably a three-wire configuration with ground, or candidate answer choice B (e.g., using bold, underline, italics, or other fonts or animation to highlight the correct answer).

Further, the third party computing service may, based on the updated state of its visual dialog state machine, provide a visual indication of a wiring diagram that includes the three-wire with ground connection used to wire the electrical device. This may include step-by-step diagrams from the third party computing service for wiring the three-wire with ground configuration, video tutorials from the third party computing service for wiring the three-wire with ground configuration, etc.

Figure 5:
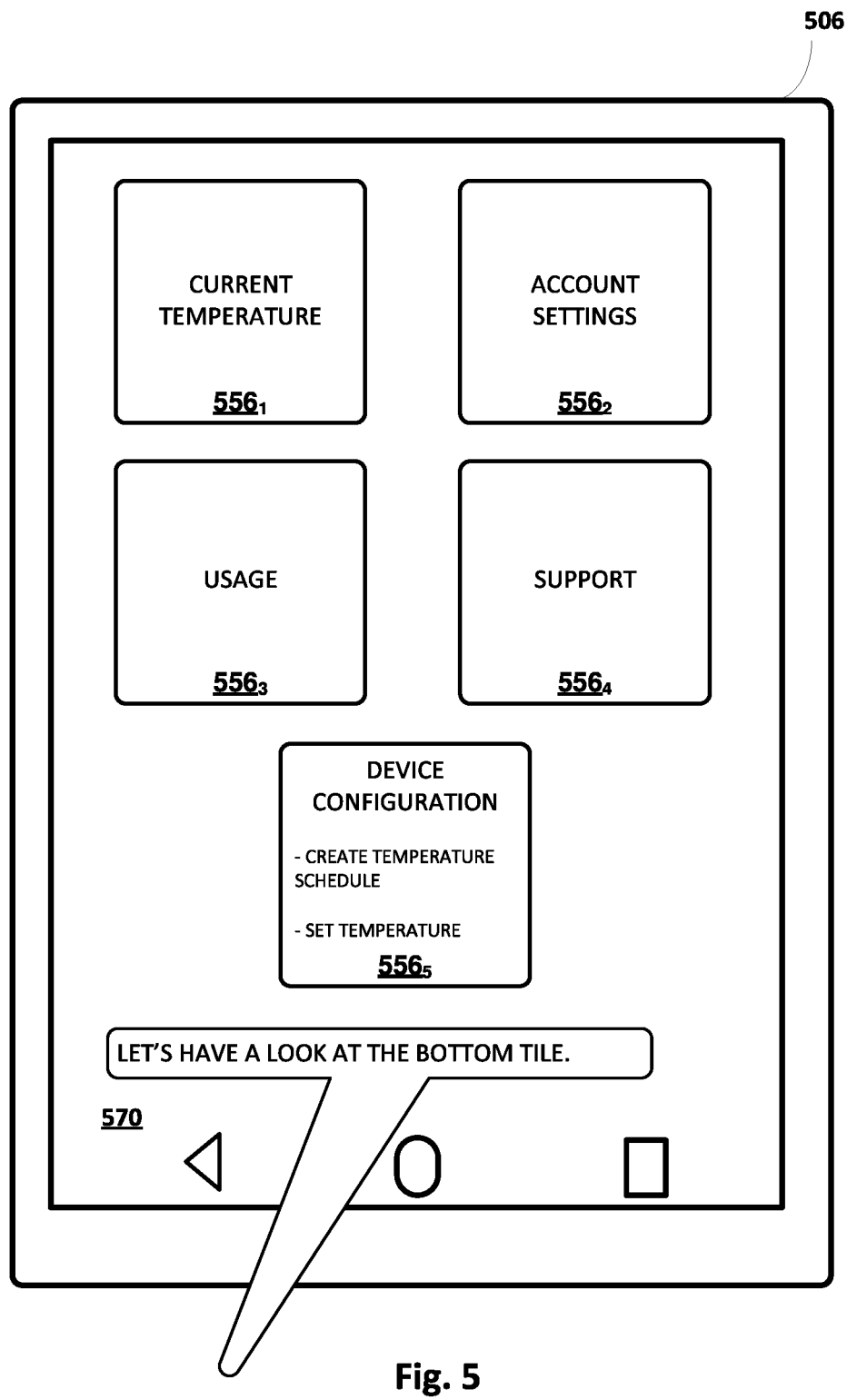
FIGS. 5 and 6 depict an example of how techniques described herein may be employed in another scenario.
Figure 6:
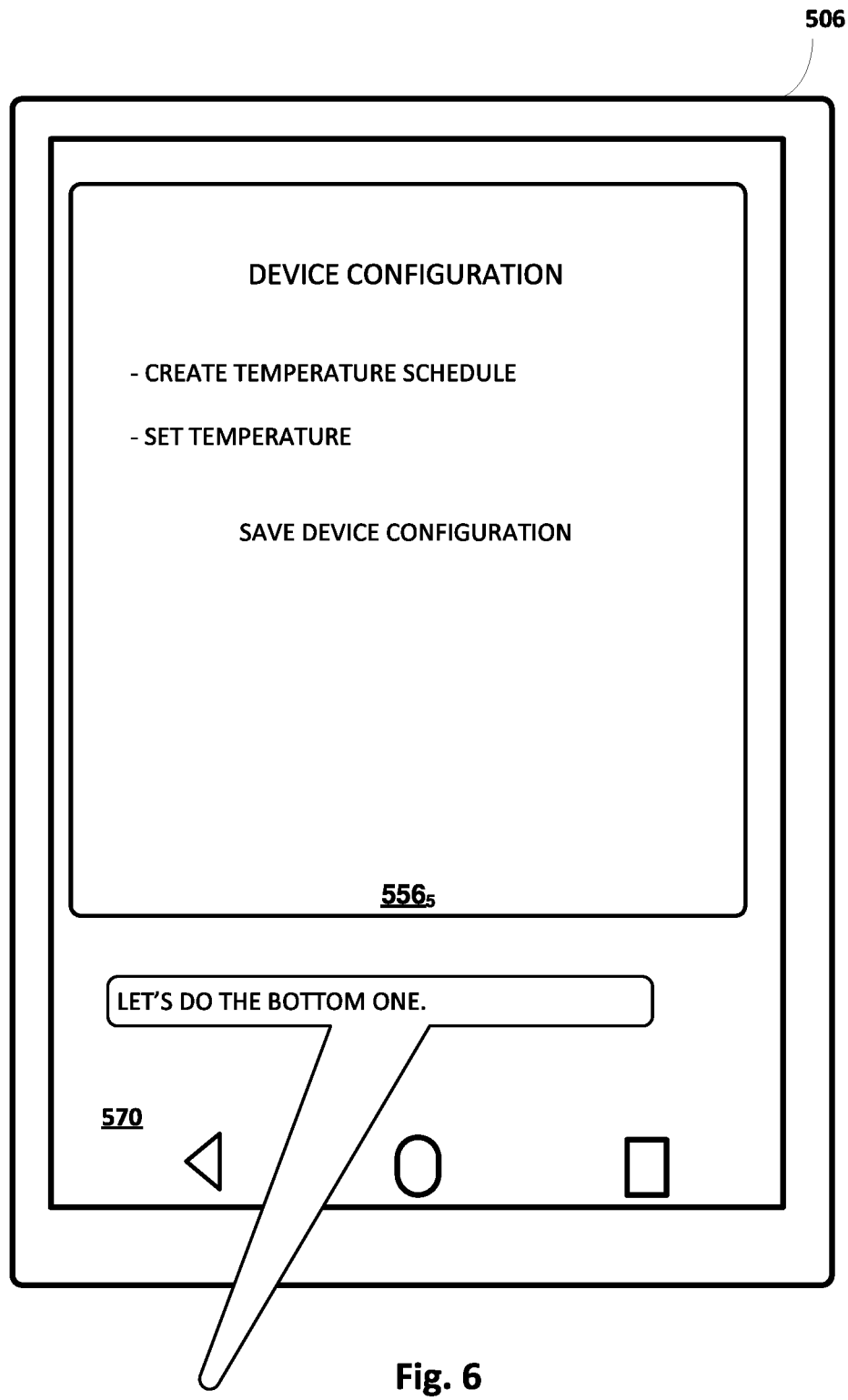

FIGS. 5 and 6 depict another example of how techniques described herein may be employed in a specific scenario. In FIG. 5, a client device 506 taking the form of a tablet computing device is currently displaying, on a touchscreen 570, a GUI related to a third party computing service (such as the third party computing service also related to the wiring configuration of a thermostat device in FIGS. 3 and 4) that provides users an interface in which they can access, monitor, interact with, and save various components and/or configurations related to the thermostat. In this example, the GUI includes a series of tiles $556_{1-6}$ (or cards) that are related to various components and/or configurations provided by the third party computing service, and allow the user to interact with actionable content provided by the third party computing service on the client device 506. A first tile $556_1$ relates to a current temperature detected by the thermostat in the user's home. A second tile $556_2$ relates to current account settings of the user. A third tile $556_3$ relates to past, present, and projected future usage of the thermostat by the user. A fourth tile $556_4$ enables the user to contact a third party hosting the third party computing service for support related to operation of the thermostat. A fifth tile $556_5$ relates to the device configuration of the thermostat device (after the device has been properly wired in FIGS. 3 and 4) that is provided by the third party computing service and may be interacted with by the user.

In FIG. 5 the user has provided the utterance, "Let's have a look at the bottom tile." This utterance may be recorded and processed using the various components of automated assistant 120 described previously, until data indicative of the user's intent makes its way to the third party computing service. The third party computing service may update its visual dialog state machine and its verbal dialog state machine accordingly. In particular, and as is shown in FIG. 6, the visual dialog state machine is transitioned to a new state that zooms in on (i.e. enlarges) the fifth tile $556_5$ and effectively makes the device configuration a focus of the visual and/or verbal dialog state machines. Additionally, the third party computing service may provide a plurality of device configuration options for display on the touchscreen 570. Consequently, in FIG. 6 when the user provides an additional utterance, "Let's do the bottom one", the third party computing service is able to resolve the term "bottom one" to be the "set temperature" device configuration, and can provide additional information about the current temperature and/or suggest a temperature for the user based on an ambient room temperature, an outdoor temperature, or a temperature that is frequently set by other users. The third party computing service via the client device 506 may ask the user to input a particular set temperature either audibly or tactilely. Further, the user may save the particular device configuration by providing audible input of "save", "save configuration", or the like. Alternatively, the user may provide tactile input by tapping "save device configuration" on the touchscreen 570.

Figure 7:
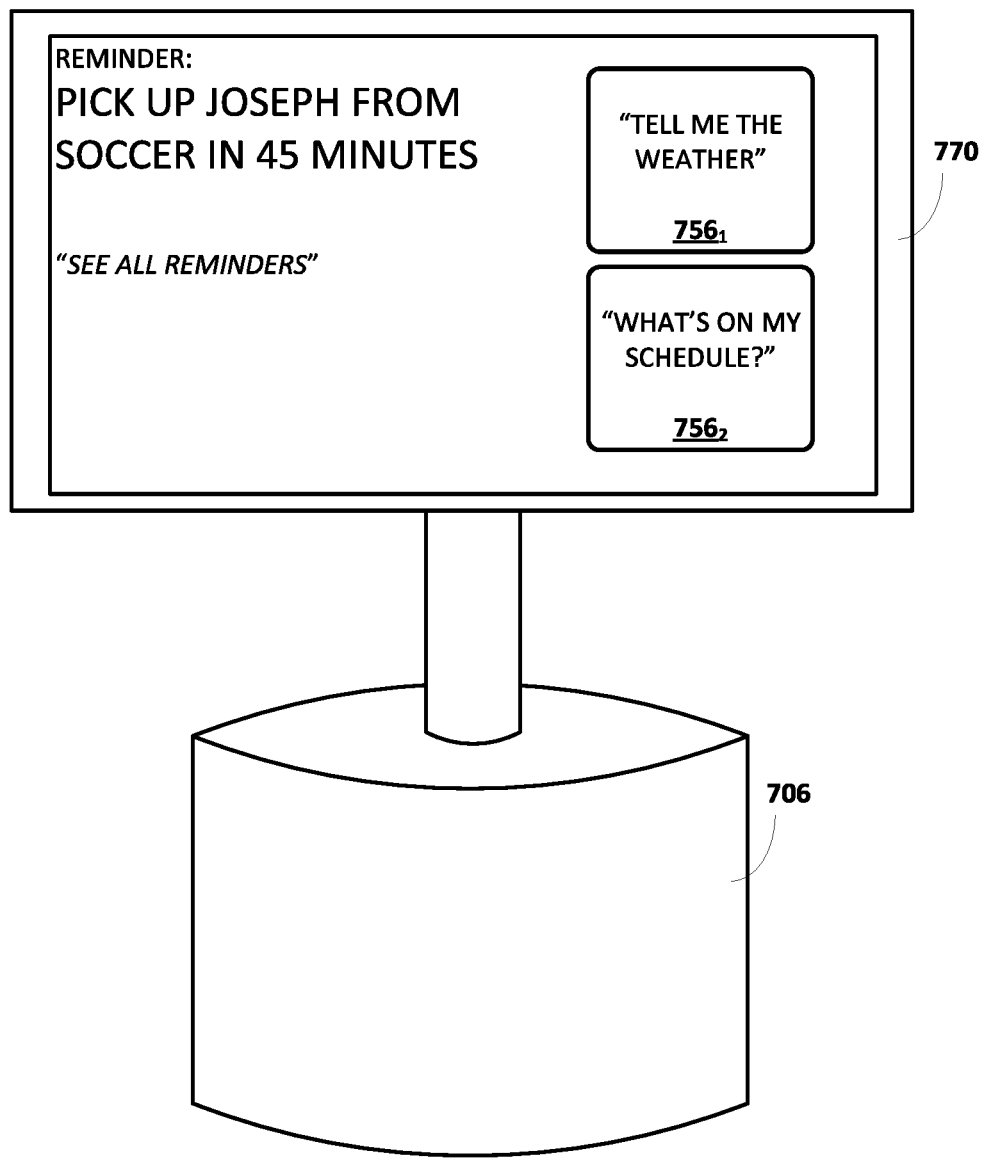
FIG. 7 depicts an example of how techniques described herein may be employed in yet another scenario.

Techniques described herein are not limited to computing services or agents that are provided by third party developers. In some implementations, techniques described herein may be employed by automated assistant 120 itself, e.g., as a "first party computing service" that is affiliated with, or even forms part of, automated assistant 120. FIG. 7 depicts an example of how techniques described herein may be employed by a first party computing service. In FIG. 7, a client device 706 takes the form of a standalone interactive speaker that has display capabilities in the form of a touchscreen display 770. In this example, display 770 renders a GUI that includes various information of potential relevance to a user (not depicted). Most relevant is a reminder that the user needs to pick up Joseph from soccer in 45 mins. In various implementations, this reminder may be pushed to the user automatically, e.g., on display 770 and/or as a card rendered on other client devices of a coordinated ecosystem of client devices that includes client device 706.

Below this reminder is what will be referred to herein as "actionable text" that reads, "See all reminders." In various implementations, the user may select actionable text, e.g., by tapping it, or the user may speak the phrase associated with the actionable text—"see all reminders" in this example—and in either case a new GUI may be rendered on display 770 by automated assistant 120 that shows the user his or her reminders. From the user's perspective, this actionable text may appear to operate similar to a hyperlink. However, in some implementations, when a user taps this actionable text, that does not trigger an HTTP command to be transmitted to an HTTP server to load a new webpage on display 770. Rather, data indicative of the user's tap may be provided to server portion 119 of automated assistant 120, which may provide data indicative of the user's tap to a computing service (first or third party). The computing service may interpret the data (e.g., as an intent to see all reminders) and respond accordingly, e.g., by updating its verbal and/or visual dialog state machines and providing visual dialog state data to client portion 108 of automated assistant 120 via server portion 119.

In some implementations, automated assistant 120 may be configured to "listen" for any utterance that corresponds to actionable text, even without requiring invocation first. Put another way, when actionable text is presented on a display, automated assistant 120 may listen for both traditional invocation phrases (e.g., "OK Assistant") and utterances associated with displayed actionable text. Thus, when confronted with the GUI in FIG. 7, a user may invoke automated assistant 120 using traditional invocation phrases and also may invoke automated assistant 120 by speaking (or tapping) the actionable text, "See all reminders."

In some implementations, additional tiles or cards may be provided that are operable to trigger other tasks that might otherwise be triggered by vocal engagement with automated assistant 120. For example, a first tile $756_1$ is operable to cause automated assistant 120 to update its verbal dialog state machine and provide audible output describing the weather. Suppose the user were to follow up with an ambiguous question such as, "what about next week?"

Based on the current verbal dialog state of the verbal dialog state machine (in which a current intent of "weather" may be active), automated assistant 120 may resolve the ambiguous query to something like "What's the weather next week," and respond accordingly. Alternatively, the phrase "Tell me the weather" may be actionable text that the user may speak (or tap) to achieve the same goal.

Another card 756₂ in FIG. 7 is operable by a user to present the user's schedule, e.g., audibly via a speaker (not depicted) of client device 706 and/or visually on display 770. Once again, the text "What's on my schedule?", e.g., by virtue of being enclosed in quotes, may be actionable text that the user may speak (instead of tapping card 756₂) to achieve the same goal. In some implementations, if the user taps on card 756₂, that may cause the user's schedule to be displayed on display 770 by automated assistant 120, whereas if the user speaks actionable text "What's on my schedule?", that may cause automated assistant 120 to audibly output the user's schedule.

Figure 8:
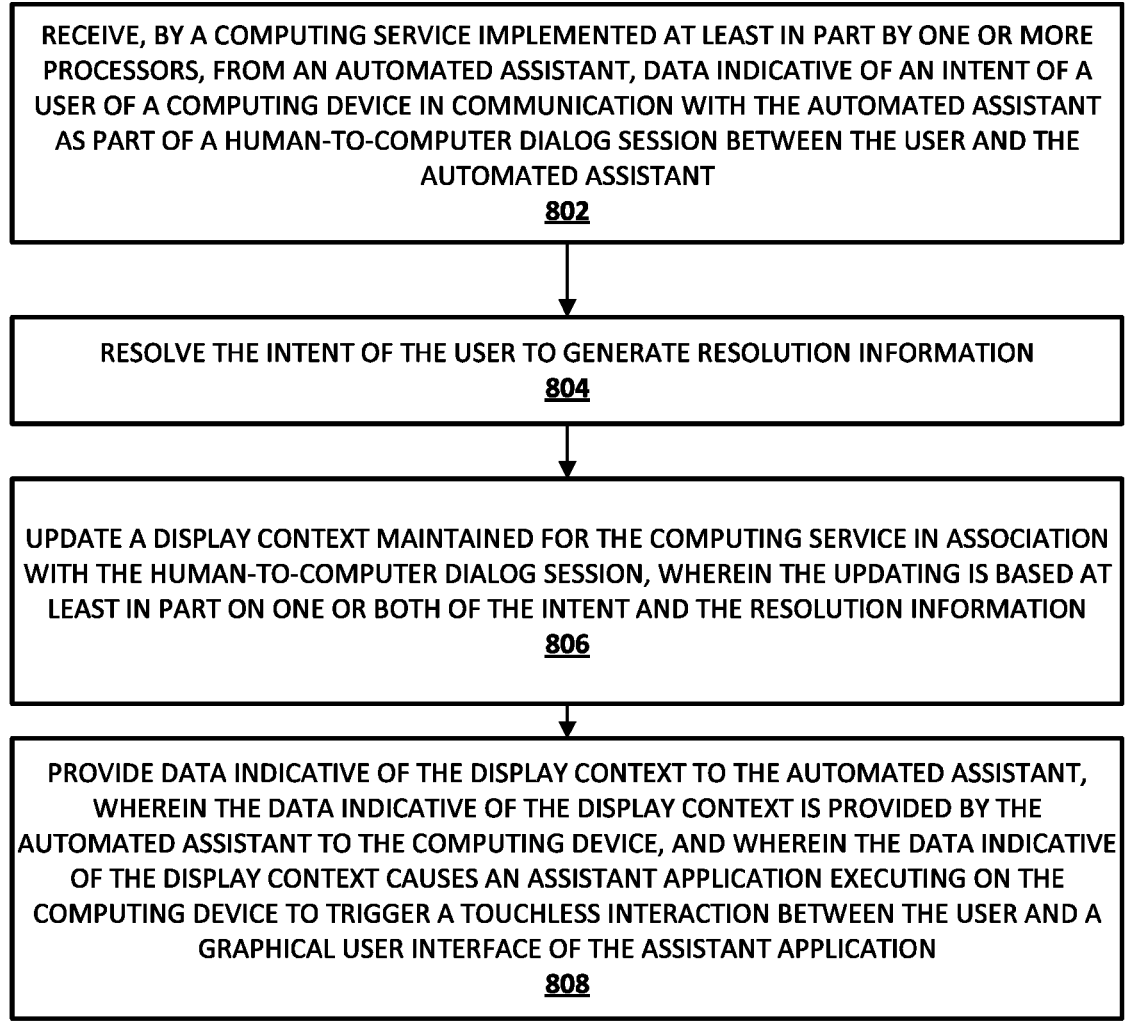
FIGS. 8 and 9 depict flowcharts illustrating example methods according to implementations disclosed herein.

FIG. 8 is a flowchart illustrating an example method 800 according to implementations disclosed herein. For convenience, the operations of the flow chart are described with reference to a system that performs the operations. This system may include various components of various computer systems, such as one or more components of computing systems that implement automated assistant 120. Moreover, while operations of method 800 are shown in a particular order, this is not meant to be limiting. One or more operations may be reordered, omitted or added. In some implementations, the operations of method 800 may be performed by one or more computing systems that operate third party computing service 140, although this is not required.

At block 802, the system may receive, e.g., at a (first or third party) computing service implemented at least in part by one or more processors, from an automated assistant (e.g., a server portion 119), data indicative of an intent of a user of a computing device (e.g., client device 106, 306, 506, 706) in communication with the automated assistant as part of a human-to-computer dialog session between the user and the automated assistant. For example, the data may include speech recognition output generated based on a vocal utterance provided by the user. Additionally or alternatively, in some implementations, the data may include an intent that is determined by server portion 119 of automated assistant 120 (in particular, intent matcher 135). In some implementations, the data may include one or more slot values that may or may not be required by the computing service. As a working example, a user engaged in a human-to-computer dialog session with automated assistant 120 may be presented with a document on a display. The user may provide a command (vocally and/or by swiping down on the screen) to scroll down through the document, e.g., to the next page.

At block 804, the system, e.g., by way of the computing service, may resolve the intent of the user to generate resolution information. For example, in the working example, the computing service may determine a "next" portion of the document to display, e.g., below the previously-displayed portion of the document. The computing service may generate a command that is designed to cause client portion 108 of automated assistant 120 operating on the client device to alter a GUI, e.g., rendered in embedded browser 248, so that the next portion of the document is now displayed.

At block 806, the system, e.g., by way of the computing service, may update a display context or visual dialog state machine maintained for the computing service in association with the human-to-computer dialog session. In various implementations, the updating of block 806 may be based at least in part on at least one of the intent determined at block 802 and the resolution information generated at block 804.

At block 808, the system, e.g., by way of the computing service, may provide data indicative of the updated display context or visual dialog state machine to automated assistant 120, and in particular, server portion 119 thereof. In various implementations, the data indicative of the display context may then be provided by server portion 119 to the computing device (e.g., 106, 306, 506, 706). In various implementations, the data indicative of the display context may cause an assistant application (e.g., client portion 108) executing on the computing device to trigger a touchless interaction between the user and a graphical user interface of the assistant application. Referring back to the working example, the display may be altered so that it "scrolls down" to the next portion of the document, without the user having to touch anything.

Figure 9:
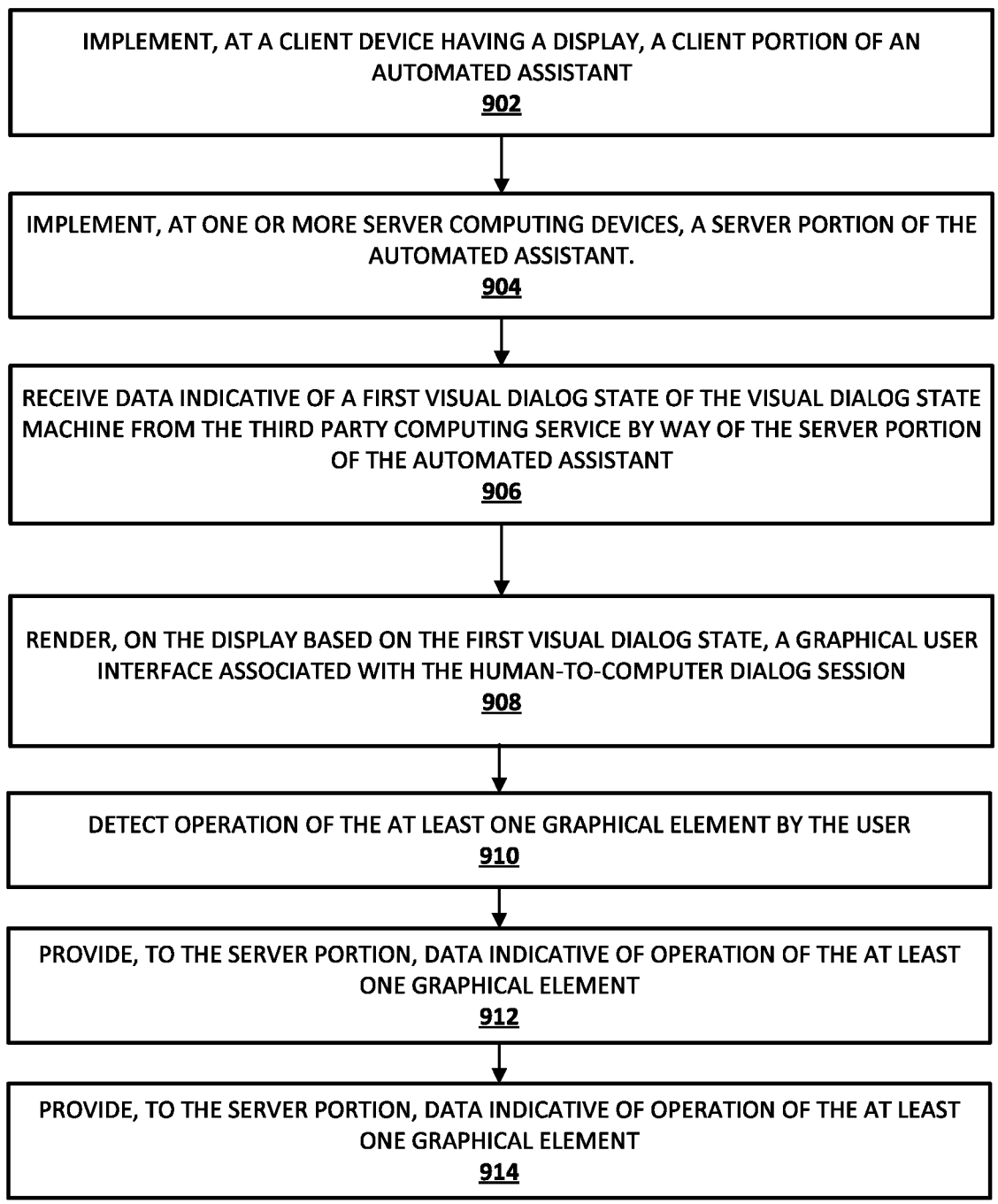

FIG. 9 is a flowchart illustrating an example method 900 according to implementations disclosed herein. For convenience, the operations of the flow chart are described with reference to a system that performs the operations. This system may include various components of various computer systems, such as one or more components of computing systems that implement automated assistant 120. Moreover, while operations of method 900 are shown in a particular order, this is not meant to be limiting. One or more operations may be reordered, omitted or added.

At block 902, the system may implement, at a client device (e.g., 106, 306, 506, 706) having a display (e.g., 306B, 570, 770), a client portion (108) of an automated assistant 120. At block 904, the system may implement, at one or more server computing devices, a server portion (119) of the automated assistant 120. In various implementations, a user may interact with the client portion 108 to participate in a human-to-computer dialog session between the user, the automated assistant 120, and a third party computing service 140. In various implementations, the third party computing service 140 may engage with the user in accordance with a verbal dialog state machine and a visual dialog state machine.

At block 906, the system may receive, e.g., at client portion 108, data indicative of a first visual dialog state of the visual dialog state machine from the third party computing service 140 by way of the server portion 119 of the automated assistant 120. At block 908, the client portion may render, on the display based on the first visual dialog state, a graphical user interface associated with the human-to-computer dialog session. In various implementations, the graphical user interface may include at least one graphical element (e.g., a button, actionable text, etc.) that is operable to cause the verbal state machine to transition from a first verbal dialog state corresponding to the first visual dialog state to a second verbal dialog state.

At block 910, the client portion 108 may detect operation of the at least one graphical element by the user. For example, the user may tap the graphical element or speak a command (e.g., utter a phrase associated with actionable text to interact with the graphical element). At block 912, the client portion 108 may provide, to the server portion 119, data indicative of operation of the at least one graphical element (e.g., an intent). At block 914, the server portion 119 may provide the data indicative of operation of the at least one graphical element to the third party computing service 140. In various implementations, the data indicative of operation of the at least one graphical element may cause the third party computing service 140 to transition from the first verbal dialog state to the second verbal dialog state.

Figure 10:
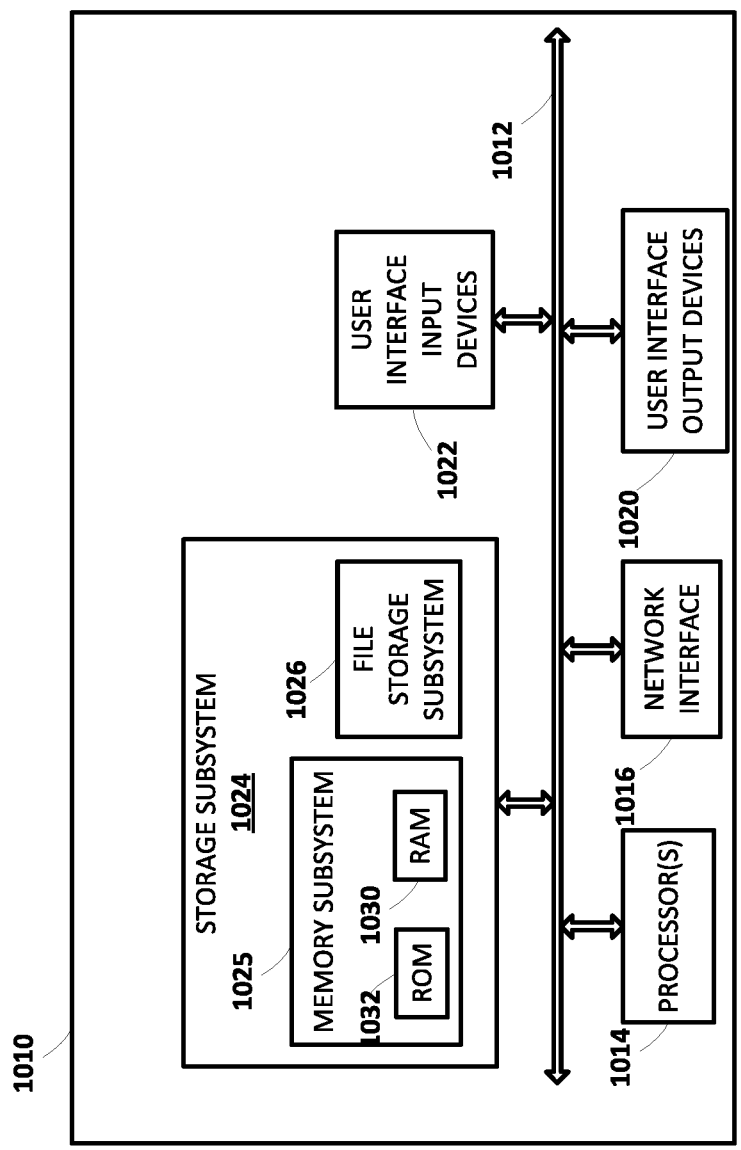
FIG. 10 illustrates an example architecture of a computing device.

FIG. 10 is a block diagram of an example computing device 1010 that may optionally be utilized to perform one or more aspects of techniques described herein. In some implementations, one or more of a client computing device, user-controlled resources module 130, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the methods of FIGS. 8-9, as well as to implement various components depicted in FIGS. 1 and 2.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. For example, in some implementations, users may opt out of assistant devices attempting to detect visual cues, e.g., by disabling vision sensor 107.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    receiving, by a third party computing service implemented at least in part by the one or more processors, first data transmitted over one or more computer networks from an automated assistant, wherein the first data is indicative of touch input provided by a user of a computing device in communication with the automated assistant as part of a human-to-computer dialog session between the user and the automated assistant;

generating resolution information based on the touch input;

updating a visual dialog state machine maintained for the third party computing service in association with the human-to-computer dialog session, wherein the updating is based at least in part on one or both of the touch input and the resolution information;

based on one or more links between one or more visual dialog states of the visual dialog state machine and one or more verbal dialog states of a verbal dialog state machine maintained for the third party computing service in parallel with the visual dialog state machine, automatically updating the verbal dialog state machine to a particular verbal dialog state;

receiving, by the third party computing service, second data transmitted over one or more of the computer networks from the automated assistant, wherein the second data is indicative of speech input provided by the user of the computing device;

generating additional resolution information based on the speech input and the updated verbal dialog state machine;

updating the visual dialog state machine based on the additional resolution information; and transmitting third data to the automated assistant over one or more of the computer networks, wherein the third data is indicative of the updated visual dialog state machine and causes an assistant application executing on the computing device to trigger a touchless interaction between the user and a graphical user interface of the assistant application.

2. The method of claim 1, wherein the graphical user interface comprises a web browser embedded into the assistant application.

3. The method of claim 1, wherein the touchless interaction comprises operation of a selectable element of the graphical user interface.

4. The method of claim 1, wherein the touchless interaction comprises scrolling to a particular position of a document rendered in the graphical user interface.

5. The method of claim 1, wherein the touchless interaction comprises zooming in on a portion of the graphical user interface.

6. A system comprising one or more processors and memory storing instructions that, in response to execution of the instructions by the one or more processors, cause the one or more processors to:

receive, by a third party computing service implemented at least in part by the one or more processors, first data transmitted over one or more computer networks from an automated assistant, wherein the first data is indicative of touch input provided by a user of a computing device in communication with the automated assistant as part of a human-to-computer dialog session between the user and the automated assistant;

generate resolution information based on the touch input;

update a visual dialog state machine maintained for the third party computing service in association with the human-to-computer dialog session, wherein the updating is based at least in part on one or both of the touch input and the resolution information;

based on one or more links between one or more visual dialog states of the visual dialog state machine and one or more verbal dialog states of a verbal dialog state machine maintained for the third party computing service in parallel with the visual dialog state machine, automatically updating the verbal dialog state machine to a particular verbal dialog state;

receiving, by the third party computing service, second data transmitted over one or more of the computer networks from the automated assistant, wherein the second data is indicative of speech input provided by the user of the computing device;

generating additional resolution information based on the speech input and the updated verbal dialog state machine;

updating the visual dialog state machine based on the additional resolution information; and transmit third data to the automated assistant over one or more of the computer networks, wherein the third second data is indicative of the updated visual dialog state machine and causes an assistant application executing on the computing device to trigger a touchless interaction between the user and a graphical user interface of the assistant application.

7. The system of claim 6, wherein the graphical user interface comprises a web browser embedded into the assistant application.

8. The system of claim 6, wherein the touchless interaction comprises operation of a selectable element of the graphical user interface.

9. The system of claim 6, wherein the touchless interaction comprises scrolling to a particular position of a document rendered in the graphical user interface.

10. The system of claim 6, wherein the touchless interaction comprises zooming in on a portion of the graphical user interface.

11. A method implemented using one or more processors, comprising:

receiving, by a third party computing service implemented at least in part by the one or more processors, first data transmitted over one or more computer networks from an automated assistant, wherein the first data is indicative of touch input provided by a user of a computing device in communication with the automated assistant as part of a human-to-computer dialog session between the user and the automated assistant;

generating resolution information based on the touch input;

updating a display context maintained for the third party computing service in association with the human-to-computer dialog session, wherein the updating is based at least in part on one or both of the intent and the resolution information;

based on one or more links between one or more visual dialog states of the visual dialog state machine and one or more verbal dialog states of a verbal dialog state machine maintained for the third party computing service in parallel with the visual dialog state machine, automatically updating the verbal dialog state machine to a particular verbal dialog state;

receiving, by the third party computing service, second data transmitted over one or more of the computer networks from the automated assistant, wherein the second data is indicative of speech input provided by the user of the computing device;

generating additional resolution information based on the speech input and the updated verbal dialog state machine;

updating the verbal dialog state machine based on the additional resolution information; and transmitting third data to the automated assistant over one or more of the computer networks, wherein the third data is indicative of the updated verbal dialog state machine.

12. The method of claim 11, wherein the graphical user interface comprises a web browser embedded into the assistant application.

* * * * *